US010650507B2

(12) United States Patent
Liu

(10) Patent No.: US 10,650,507 B2
(45) Date of Patent: May 12, 2020

(54) IMAGE DISPLAY METHOD AND APPARATUS IN VR DEVICE, AND VR DEVICE

(71) Applicant: Tencent Technology (Shenzhen) Company Limited, Shenzhen (CN)

(72) Inventor: Hao Liu, Shenzhen (CN)

(73) Assignee: Tencent Technology (Shenzhen) Company Limited, Shenzhen, Guangdong (CN)

(*) Notice: Subject to any disclaimer, the term of this patent is extended or adjusted under 35 U.S.C. 154(b) by 0 days.

(21) Appl. No.: 16/506,712

(22) Filed: Jul. 9, 2019

(65) Prior Publication Data

US 2019/0333201 A1 Oct. 31, 2019

Related U.S. Application Data

(63) Continuation of application No. PCT/CN2018/072091, filed on Jan. 10, 2018.

(30) Foreign Application Priority Data

Apr. 20, 2017 (CN) .......................... 2017 1 0263758

(51) Int. Cl.
*G06T 5/50* (2006.01)
*G06T 5/00* (2006.01)

(52) U.S. Cl.
CPC ............... *G06T 5/50* (2013.01); *G06T 5/002* (2013.01); *G06T 2200/12* (2013.01); *G06T 2207/20192* (2013.01); *G06T 2207/20221* (2013.01)

(58) Field of Classification Search
None
See application file for complete search history.

(56) References Cited

U.S. PATENT DOCUMENTS

2006/0110072 A1* 5/2006 Domera-Venkata ...... G06T 5/50
382/299
2009/0324122 A1 12/2009 Kao et al.
(Continued)

FOREIGN PATENT DOCUMENTS

CN 101866096 A 10/2010
CN 103996170 A 8/2014
(Continued)

OTHER PUBLICATIONS

Tencent Technology, ISR, PCT/CN2018/072091, Mar. 21, 2018, 2 pgs.

*Primary Examiner* — Nurun N Flora
(74) *Attorney, Agent, or Firm* — Morgan, Lewis & Bockius LLP

(57) ABSTRACT

The present disclosure discloses an image display method and apparatus in a virtual reality (VR) device. The method includes: obtaining a first image to be displayed by the VR device, an edge of a target object in the first image having an aliasing shape, the VR device being provided with an electromagnetic vibrator, and the electromagnetic vibrator being configured to control the first image to move by a first distance along a first direction; obtaining a second image after the electromagnetic vibrator vibrates, the second image being an image obtained after the first image is moved by the first distance along the first direction; performing a superimposition operation on the first image and the second image to obtain a target image, an edge of the target object in the target image changing from the aliasing shape to a smooth shape; and displaying the target image in the VR device.

18 Claims, 7 Drawing Sheets

(56) References Cited

U.S. PATENT DOCUMENTS

| | | |
|---|---|---|
| 2013/0038603 A1 | 2/2013 | Bae |
| 2014/0253584 A1* | 9/2014 | Harper .................... G06T 11/60 345/611 |
| 2015/0237236 A1* | 8/2015 | Elliott .................. G09G 3/2003 345/600 |
| 2015/0287220 A1* | 10/2015 | Jain .......................... G09G 5/28 345/589 |
| 2017/0031172 A1* | 2/2017 | Lofftus .................. G02B 27/48 |
| 2017/0118453 A1* | 4/2017 | Kim ........................ H04N 9/07 |

FOREIGN PATENT DOCUMENTS

| | | |
|---|---|---|
| CN | 104867109 A | 8/2015 |
| CN | 105391913 A | 3/2016 |
| CN | 105787891 A | 7/2016 |
| CN | 105934902 A | 9/2016 |
| CN | 10712306 A | 9/2017 |

* cited by examiner

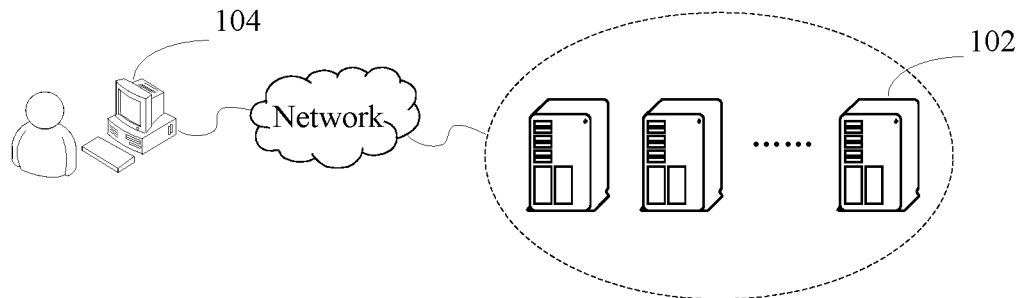

FIG. 1

| Obtain a first image to be displayed by the VR device, an edge of a target object in the first image having an aliasing shape, the VR device being provided with an electromagnetic vibrator, and the electromagnetic vibrator being configured to control the first image to move by a first distance along a first direction | ~ S202 |

↓

| Obtain a second image after the electromagnetic vibrator vibrates, the second image being an image obtained after the first image is moved by the first distance along the first direction | ~ S204 |

↓

| Perform a superimposition operation on the first image and the second image to obtain a target image, an edge of the target object in the target image changing from the aliasing shape to a smooth shape | ~ S206 |

↓

| Display the target image in the VR device | ~ S208 |

FIG. 2

IMAGE DISPLAY METHOD AND APPARATUS IN VR DEVICE, AND VR DEVICE

CROSS-REFERENCE TO RELATED APPLICATIONS

This application is a continuation application of PCT/CN2018/072091, entitled "IMAGE DISPLAY METHOD AND APPARATUS IN VR DEVICE, AND VR DEVICE" filed on Jan. 10, 2018, which claims priority to Chinese Patent Application No. 201710263758.8, entitled "IMAGE DISPLAY METHOD AND APPARATUS IN VR DEVICE, AND VR DEVICE" filed with the Chinese Patent Office on Apr. 20, 2017, all of which are incorporated by reference in their entirety.

FIELD OF THE TECHNOLOGY

The present disclosure relates to the field of virtual reality (VR), and specifically, to an image display method and apparatus in a VR device, a VR device, a storage medium, and an electronic apparatus.

BACKGROUND OF THE DISCLOSURE

Currently, two embedded convex lenses are mainly configured in VR glasses. Because there is only one screen, it is necessary to separate images viewed by left and right eyes to have stereoscopic vision. 3D stereoscopic glasses can simulate a real situation, so that pictures in the left and right eyes are continuously and alternately displayed on the screen, and in addition to a physiological characteristic of persistence of vision of a human eye, a stereoscopic 3D image can be viewed. A lens of a VR helmet creates different picture depth perception in local space based on different visual fields, to form a VR field of view in a vision system in a brain of a user. However, a main limiting factor in the VR field of view is a lens instead of a pupil. To obtain a wider field of view, it is necessary to reduce a distance between an eyeball of the user and the lens or increase a size of the lens. In consideration of a size and weight of a head-mounted helmet, if a lighter and thinner lens is used, a distance between the lens and a display screen is increased, but the size of the helmet also increases; while, if a thicker lens is used, the distance between the lens and the display screen is reduced, but a new engineering challenge is posed for a thickness of the lens because geometric distortion and chromatic aberration occur.

Due to insufficient resolution of the display screen, an edge of an object in VR has very obvious aliasing, resulting in a very rough edge. In addition, because real-time rendering is performed in VR, when a head rotates slightly, it feels like that a thin line (or edge lines of some objects) that should be still is flickering or dancing, and an edge of an object with very high contrast sparkles distractingly. It feels like that a pixel flickers between several high-purity colors of RGB.

For the foregoing problems, currently, no effective solution is proposed.

SUMMARY

Embodiments of the present disclosure provide an image display method and apparatus in a VR device, a VR device, a storage medium, and an electronic apparatus, to resolve at least a technical problem in a related technology that an edge of an object in an image has an aliasing shape due to relatively low resolution of a display screen of VR glasses.

According to a first aspect of the embodiments of the present disclosure, an image display method in a VR device is performed at a virtual reality (VR) device having one or more processors and memory storing a plurality of programs to be executed by the one or more processors. The method includes: obtaining a first image to be displayed by the VR device, an edge of a target object in the first image having an aliasing shape, the VR device being provided with an electromagnetic vibrator, and the electromagnetic vibrator being configured to control the first image to move by a first distance along a first direction; obtaining a second image after the electromagnetic vibrator vibrates, the second image being an image obtained after the first image is moved by the first distance along the first direction; performing a superimposition operation on the first image and the second image to obtain a target image, an edge of the target object in the target image changing from the aliasing shape to a smooth shape; and displaying the target image in the VR device.

According to a second aspect of the embodiments of the present disclosure, an image display apparatus in a VR device is further provided. The apparatus includes: a first obtaining unit, configured to obtain a first image to be displayed by the VR device, an edge of a target object in the first image having an aliasing shape, the VR device being provided with an electromagnetic vibrator, and the electromagnetic vibrator being configured to control the first image to move by a first distance along a first direction; a second obtaining unit, configured to obtain a second image after the electromagnetic vibrator vibrates, the second image being an image obtained after the first image is moved by the first distance along the first direction; a superimposition unit, configured to perform a superimposition operation on the first image and the second image to obtain a target image, an edge of the target object in the target image changing from the aliasing shape to a smooth shape; and a display unit, configured to display the target image in the VR device.

According to another aspect of the embodiments of the present disclosure, a VR device is further provided. The VR device includes: an electromagnetic vibrator, disposed in the VR device, and configured to control a first image to be displayed by the VR device to move by a first distance along a first direction, an edge of a target object in the first image having an aliasing shape; and a processor, configured to: obtain the first image before the electromagnetic vibrator vibrates; obtain a second image after the electromagnetic vibrator vibrates, the second image being an image obtained after the first image is moved by the first distance along the first direction; perform a superimposition operation on the first image and the second image to obtain a target image, an edge of the target object in the target image changing from the aliasing shape to a smooth shape; and display the target image in the VR device.

According to another aspect of the embodiments of the present disclosure, a storage medium is further provided. The storage medium stores a computer program, the computer program being configured to perform the image display method in a VR device in the embodiments of the present disclosure when being run.

According to another aspect of the embodiments of the present disclosure, an electronic apparatus is further provided. The electronic apparatus includes a memory and a processor, the memory storing a computer program, and the processor being configured to run the computer program to perform the image display method in a VR device in the embodiments of the present disclosure.

In the embodiments of the present disclosure, an electromagnetic vibrator is disposed in the VR device, the electromagnetic vibrator can cause a first image to be displayed by the VR device to move by a first distance along a first direction, where an edge of a target object in the first image has an aliasing shape; after the electromagnetic vibrator vibrates, the first image is moved by the first distance along the first direction, to obtain a second image; and then a superimposition operation is performed on the second image and the first image, to obtain a target image and display the target image in the VR device, where an edge of the target object in the target image changes from the aliasing shape to a smooth shape, to eliminate aliasing of the edge of the target object in the first image, thereby resolving a technical problem in a related technology that an edge of an object in an image has an aliasing shape due to relatively low resolution of a display screen of VR glasses, and improving an image display effect of the VR device.

BRIEF DESCRIPTION OF THE DRAWINGS

The accompanying drawings described herein are intended to provide further understanding of the present disclosure and constitute a part of this application. Exemplary embodiments of the present disclosure and the description thereof are used for explaining the present disclosure rather than constituting the improper limitation to the present disclosure. In the figures:

FIG. 1 is a schematic diagram of a hardware environment of an image display method in a VR device according to an embodiment of the present disclosure.

FIG. 2 is a flowchart of an optional image display method in a VR device according to an embodiment of the present disclosure.

DESCRIPTION OF EMBODIMENTS

Figure 3:
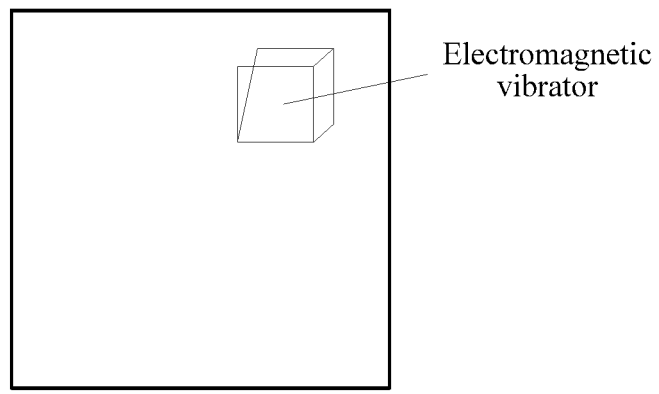
FIG. 3 is a schematic diagram of disposition of an electromagnetic vibrator at a back surface of a VR device according to an embodiment of the present disclosure.

To make a person skilled in the art understand the solutions in the present disclosure better, the following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be noted that, the specification and claims of the present disclosure, and terms "first" and "second" in the foregoing accompanying drawings are used to distinguish similar objects, but are unnecessarily used to describe a specific sequence or order. It should be understood that, data used in this way is exchangeable in a proper case, so that the embodiments of the present disclosure that are described herein can be implemented in another order except those shown or described herein. Moreover, the terms "include", "contain" and any other variants mean to cover a non-exclusive inclusion. For example, a process, a method, a system, a product, or a device that includes a series of steps or units is not necessarily limited to those steps or units that are expressly listed, but may include other steps or units not expressly listed or inherent to such a process, method, product, or device.

According to an aspect of the embodiments of the present disclosure, an image display method in a VR device is provided.

Optionally, in this embodiment, the image display method in a VR device may be applied to a hardware environment including a server 102 and a terminal 104 shown in FIG. 1. As shown in FIG. 1, the server 102 is connected to the terminal 104 through a network. The network includes, but is not limited to, a wide area network, a metropolitan area network, or a local area network, and the terminal 104 is not limited to a personal computer (PC), a mobile phone, a tablet computer, or the like. The image display method in a VR device in this embodiment of the present disclosure may be performed by the server 102, or may be performed by the terminal 104, or may be performed by both the server 102 and the terminal 104. The terminal 104 may perform the image display method in a VR device in this embodiment of the present disclosure by using a client installed on the terminal 104.

Herein, it should be noted that, the image display method in a VR device in this embodiment of the present disclosure may be performed by the VR device, or performed by a processor in the VR device, or performed by an application program on a processor in the VR device.

FIG. 2 is a flowchart of an optional image display method in a VR device according to an embodiment of the present disclosure. As shown in FIG. 2, the method may include the following steps:

Step S202: Obtain a first image to be displayed by the VR device, an edge of a target object in the first image having an aliasing shape, the VR device being provided with an electromagnetic vibrator, and the electromagnetic vibrator being configured to control the first image to move by a first distance along a first direction.

Step S204: Obtain a second image after the electromagnetic vibrator vibrates, the second image being an image obtained after the first image is moved by the first distance along the first direction.

Step S206: Perform a superimposition operation on the first image and the second image to obtain a target image, an edge of the target object in the target image changing from the aliasing shape to a smooth shape.

Step S208: Display the target image in the VR device.

According to step S202 to step S208, an electromagnetic vibrator is disposed in the VR device, the electromagnetic vibrator can cause a first image to be displayed by the VR device to move by a first distance along a first direction, where an edge of a target object in the first image has an aliasing shape; after the electromagnetic vibrator vibrates, the first image is moved by the first distance along the first direction, to obtain a second image; and then a superimposition operation is performed on the second image and the first image, to obtain a target image and display the target image in the VR device, where an edge of the target object in the target image changes from the aliasing shape to a smooth shape, to eliminate aliasing of the edge of the target object in the first image, thereby resolving a technical problem in a related technology that an edge of an object in an image has an aliasing shape due to relatively low resolution of a display screen of VR glasses, and improving an image display effect of the VR device.

In the technical solution provided in step S202, a type or a model of the VR device is not specifically limited in this embodiment of the present disclosure. For example, the VR device may be VR glasses or a head-mounted helmet. The VR device in this embodiment of the present disclosure may include a lens, mainly used for forming a VR field of view. The VR device may further include a display screen. An electromagnetic vibrator may be disposed at a back surface of the display screen. The electromagnetic vibrator may be configured to control an image to be displayed in the VR device to move by a particular distance in a specific direction. Herein, it should be noted that, the display screen of the VR device in this embodiment of the present disclosure may have relatively low resolution. In this embodiment of the present disclosure, the electromagnetic vibrator may be disposed at the back surface of the display screen to avoid aliasing of an edge of an object in the image that is caused due to the relatively low resolution of the display screen. It should be further noted that, a disposition position of the electromagnetic vibrator at the back surface of the display screen is not specifically limited in this embodiment of the present disclosure. The disposition position of the electromagnetic vibrator may be set according to an actual requirement. It should be further noted that, a type and a model of the electromagnetic vibrator are not specifically limited in this embodiment of the present disclosure. For example, the electromagnetic vibrator may be a micro high-frequency electromagnetic vibrator.

Figure 4:
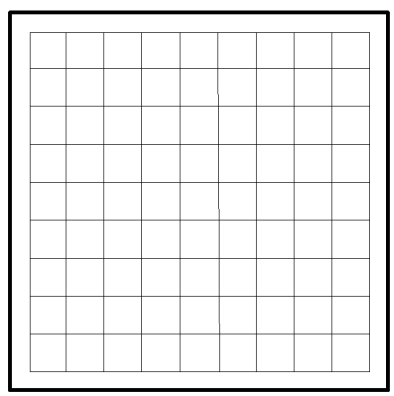
FIG. 4 is a schematic diagram of a display screen at a front surface of a VR device according to an embodiment of the present disclosure.
Figure 5:
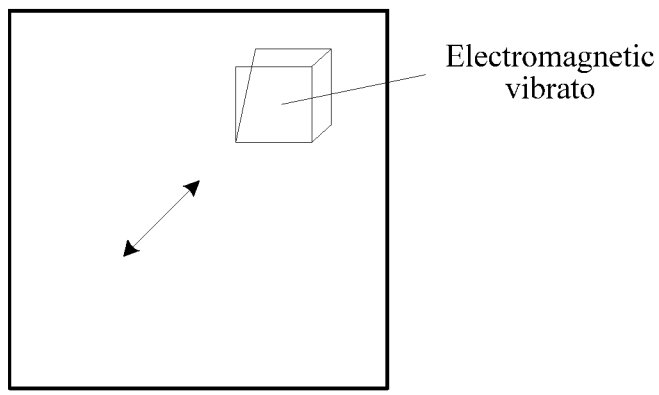
FIG. 5 is a schematic diagram of vibration of an electromagnetic vibrator according to an embodiment of the present disclosure.
Figure 6:
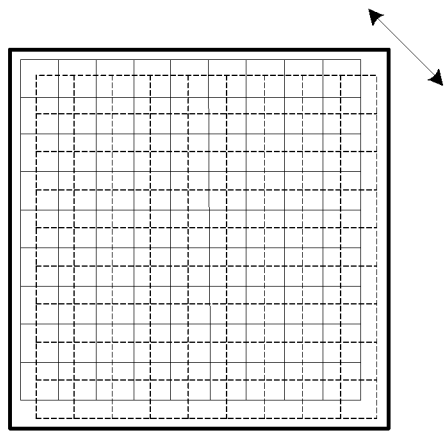
FIG. 6 is a schematic diagram of vibration of a display screen according to an embodiment of the present disclosure.

It should be further noted that, the electromagnetic vibrator may drive, through vibration of the electromagnetic vibrator, the display screen to vibrate. It should be noted that, a vibration frequency, a vibration direction, and a vibration distance of the electromagnetic vibrator may be set according to an actual requirement. This is not specifically limited herein. Vibration of the display screen by the electromagnetic vibrator is described in detail below with reference to FIG. 3 to FIG. 6. As shown in FIG. 3, the electromagnetic vibrator is disposed at the back surface of the display screen of the VR device. A front surface of the display screen of the VR device is shown in FIG. 4, and each grid in FIG. 4 indicates one pixel. As shown in FIG. 5, after the electromagnetic vibrator is turned on, high-frequency vibration is generated. An arrow in FIG. 5 indicates a vibration direction of the electromagnetic vibrator viewed from the back surface of the display screen, and indicates vibration towards the lower left corner. The electromagnetic vibrator drives the display screen to vibrate. Comparison of the display screen before and after the vibration is shown in FIG. 6. A solid-line box in FIG. 6 indicates the display screen before the vibration, and a dashed-line box indicates the display screen after the vibration. An arrow in FIG. 6 indicates a vibration direction of the display screen viewed from the front surface of the display screen, and indicates vibration towards the lower right corner. Assuming that a side length of each grid in FIG. 6 indicates one pixel distance, a vibration distance of the display screen in FIG. 6 is $$\frac{\sqrt{2}}{2} \times$$

the pixel distance.

Figure 7:
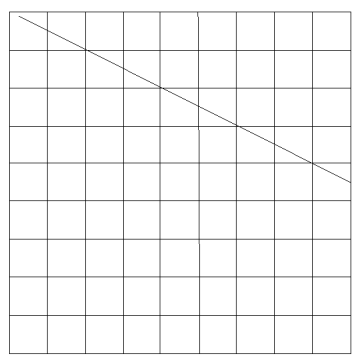
FIG. 7 is a schematic diagram of a target object according to an embodiment of the present disclosure.
Figure 8:
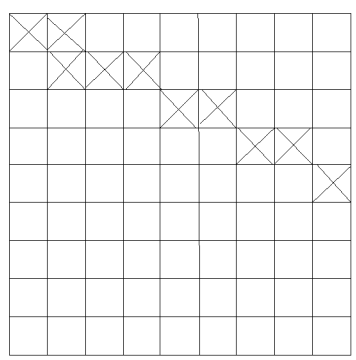
FIG. 8 is a schematic diagram of a first image according to an embodiment of the present disclosure.

The first image in this embodiment of the present disclosure may be an image to be displayed by the VR device. Due to the relatively low resolution of the display screen of the VR device, the edge of the target object in the first image displayed on the display screen of the VR device has the aliasing shape. Herein, it should be noted that, the target object is not specifically limited in this embodiment of the present disclosure. For example, as shown in FIG. 7 and FIG. 8, the target object in the display screen in FIG. 7 is a straight line, and FIG. 8 shows the first image. The straight line on the display screen has an aliasing shape, as shown by a grid with a cross in the figure.

The electromagnetic vibrator may vibrate the display screen to move, by the first distance along the first direction, the first image to be displayed on the display screen. The first direction may be a direction in which the electromagnetic vibrator drives the display screen to vibrate, and the first distance may be the vibration distance of the display screen.

Figure 9:
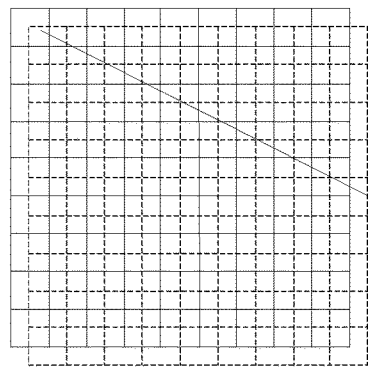
FIG. 9 is a schematic diagram of comparison of a display screen before and after vibration according to an embodiment of the present disclosure.

To eliminate aliasing of the edge of the target object in the first image, and make imaging of the target object clearer, in this embodiment of the present disclosure, preferably, the electromagnetic vibrator controls the first image to move by the first distance along the first direction. An angle between the first direction and a horizontal direction is 45 degrees. Specifically, an angle between the first direction and one side of a grid is 45 degrees. Each pixel in the first image is indicated by one grid. For example, the first direction may be the lower right corner, the lower left corner, the upper right corner, or the upper left corner. As shown in FIG. 9, a solid-line box indicates the display screen before the vibration, and a dashed-line box indicates the display screen after the vibration. It can be learned from FIG. 9 that the first direction is the lower right corner. Preferably, the first distance may be calculated according to the following formula:

$$L = \frac{\sqrt{2}}{2} \times m,$$

where L is the first distance, and m is the pixel distance in the first image. As shown in FIG. 9, a length of one side of a grid in FIG. 9 indicates a pixel distance. It can be learned from FIG. 9 that the first distance is $$\frac{\sqrt{2}}{2}$$

times the pixel distance.

It should be noted that, in this embodiment of the present disclosure, the electromagnetic vibrator is used to control the first image to move by $$\frac{\sqrt{2}}{2}$$

times the pixel distance along the direction that has an angle of 45 degrees from the horizontal direction, so that a pixel in the display screen after the vibration can cover a pixel in the display screen before the vibration, to eliminate aliasing of the edge of the target object in the first image by performing a corresponding processing operation on the images before and after the vibration, thereby improving the image display effect of the display screen of the VR device.

Figure 10:
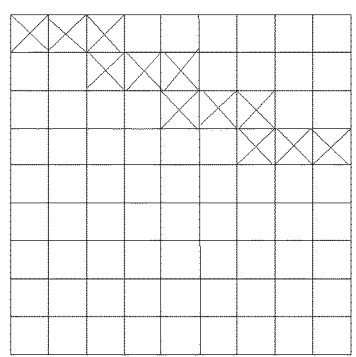
FIG. 10 is a schematic diagram of a second image according to an embodiment of the present disclosure.

In the technical solution provided in step S204, after the electromagnetic vibrator vibrates, the display screen vibrates under the action of the electromagnetic vibrator, so that the first image is moved by the first distance along the first direction, to obtain the second image. As shown in FIG. 9 and FIG. 10, in FIG. 9, relative positions of the display screen before and after the vibration are compared to indicate a movement direction and a movement distance of the first image. As shown in FIG. 9, the first image is moved along a direction of the lower right corner, and after the electromagnetic vibrator vibrates, the second image is obtained. In FIG. 9, the solid-line box indicates the first image, and the dashed-line box indicates the second image. It should be noted that, after the electromagnetic vibrator drives the display screen to vibrate, to avoid impact of the vibration on a viewport and an orientation of a rendering scene of the VR device, the orientation and a position of the rendering scene need to be changed. For example, when the display screen vibrates to the lower right corner, the viewport is adjusted to the upper left, and the movement distance is the same as a vibration distance. In this way, a position of a rendering object remains unchanged. After the electromagnetic vibrator vibrates and the rendering viewport is changed, a display effect of the straight line in FIG. 7 on the display screen is shown in FIG. 10, and refer to a grid with a cross in FIG. 10.

In the technical solution provided in step S206, after the first image and the second image are obtained, in this embodiment of the present disclosure, the superimposition operation may be performed on the first image and the second image. After the superimposition operation is performed, the target image can be obtained, and the edge of the target object in the target image changing from the aliasing shape to the smooth shape. Herein, it should be noted that, the superimposition operation performed on the first image and the second image is to update a grayscale value of each pixel in the first image, instead of simply superimposing the two images, to make the edge of the target object in the first image change from the aliasing shape to the smooth shape, thereby improving a display effect of the first image.

In an optional embodiment, step S206 of performing a superimposition operation on the first image and the second image to obtain a target image may include the following step:

Step S2062: Perform a first update operation on a grayscale value of a first pixel that is in the first image and that overlaps the second image.

It should be noted that, the first pixel is a pixel in the first image, and the first pixel completely or partially overlaps the second image. For example, as shown in FIG. 9, 1/4 of a first pixel (a first grid at the upper left corner) in the first image overlaps the second image, so that the pixel is the first pixel. For another example, as shown in FIG. 9, all of a first pixel (a second grid at a second row at the upper left corner) in the first image overlaps the second image, so that the pixel is the first pixel.

It should be further noted that, after the first pixel that is in the first image and that overlaps the second image is determined, in this embodiment, the first update operation may be performed on the first pixel. The first update operation may include two parts of operations that are specifically:

a first part of operation: updating a grayscale value of a first part that is in the first pixel and that overlaps a second pixel to an average value of the grayscale value of the first pixel and a grayscale value of the second pixel; and a second part of operation: updating a grayscale value of a second part that is in the first pixel and that does not overlap the second image to a predetermined ratio of the grayscale value of the first pixel.

For the foregoing operation, it should be noted that, the second pixel may be a pixel that is in the second image and that overlaps the first pixel. For example, as shown in FIG. 9, a first pixel (a first grid at the upper left corner) in the second image overlaps the first pixel (the first grid at the upper left corner) in the first image, that is, 1/4 of the first pixel, so that the first pixel in the second image is the second pixel.

Figure 11:
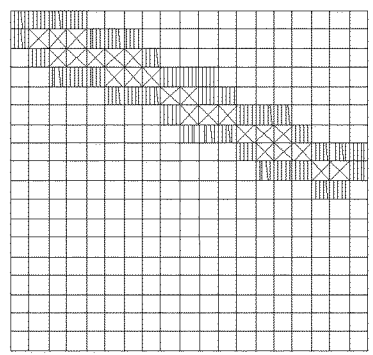
FIG. 11 is a schematic diagram of a grayscale value of a pixel in a target image according to an embodiment of the present disclosure.

It should be further noted that, as shown in FIG. 9, the first pixel in the first image may be divided into two parts, where one part overlaps the second pixel, and the other part does not overlap the second image. In this embodiment, the grayscale value of the first part that is in the first pixel and that overlaps the second pixel may be updated, to update the grayscale value to the average value of the grayscale value of the first pixel and the grayscale value of the second pixel; and the grayscale value of the second part that is in the first pixel and that does not overlap the second image may be updated, to update the grayscale value to the predetermined ratio of the grayscale value of the first pixel. The predetermined ratio in this embodiment is preferably 1/2. After the foregoing update operations are performed on the first image and the second image, the target image can be obtained. The target image may be an image obtained after the grayscale value of the pixel in the first image is updated. For example, in the target image shown in FIG. 11, a part with a vertical line is the second part that is in the first pixel and that does not overlap the second image, and the grayscale value of the second part is 1/2 of a grayscale value of a corresponding pixel part in the first image, and may be obtained with reference to a grayscale value of a pixel in the images shown in FIG. 8 and FIG. 10; and a part with a cross is the first part that is in the first pixel and that overlaps the second pixel, and the grayscale value of the first part is the average value of the grayscale value of the first pixel and the grayscale value of the second pixel, and may be obtained with reference to a grayscale value of a pixel in the images shown in FIG. 8 and FIG. 10.

In this embodiment, the first update operation is performed on the first pixel that is in the first image and overlaps the second image, so that the edge of the target object in the target image obtained after at least the first update operation is performed on the first image changes from the aliasing shape to the smooth shape, thereby eliminating aliasing of the edge of the object in the image in the VR device, and improving the image display effect of the VR device.

Considering that an image is caused to present a screen door effect due to the relatively low resolution of the display screen of the VR device, that is, there are gaps between pixels in the image, and a distance between the gaps is less than the pixel distance. For example, in an image shown by a solid-line box in FIG. 12, a bold side between small grids indicates a gap between pixels. To eliminate the gap between the pixels in the image, to prevent the screen door effect of the image from affecting an image display effect, in this embodiment of the present disclosure, the electromagnetic vibrator may be further used to vibrate the display screen to eliminate the screen door effect in the image. For details, refer to the following optional embodiment:

In another optional embodiment, gaps whose distance therebetween is a second distance exist between pixels in the first image to be displayed by the VR device. Herein, it should be noted that, the second distance is less than the pixel distance. To eliminate a screen door effect of the first image caused by the gaps, after the first image and the second image are obtained, in this embodiment, step S206 of performing a superimposition operation on the first image and the second image to obtain a target image may further include the following step:

Step S2064: Perform a second update operation on grayscale values of the gaps between the pixels in the first image.

Figure 12:
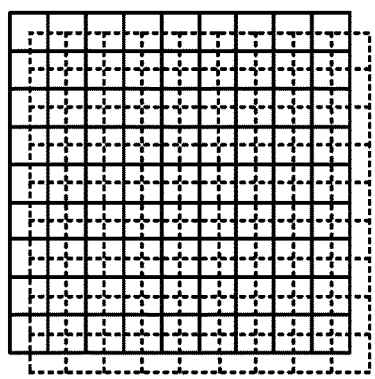
FIG. 12 is a schematic diagram of gaps between pixels in a target image according to an embodiment of the present disclosure.

It should be noted that, as shown in FIG. 12, the image shown by the solid-line box indicates the first image, and an image shown by a dashed-line box indicates the second image. It can be learned from FIG. 12 that, the gaps between the pixels in the first image may be divided into two parts, where one part overlaps a pixel in the second image, and the other part does not overlap a pixel in the second image.

In this embodiment, the second update operation may be performed on the grayscale values of the gaps between the pixels in the first image, to eliminate the screen door effect caused by the gaps between the pixels in the first image. Specifically, in this embodiment, a grayscale value of a third part that is in the gap between the pixels in the first image and that overlaps a third pixel may be updated to an average value of the grayscale value of the gap and a grayscale value of the third pixel. Herein, it should be noted that, the third pixel may be a pixel that is in the second image and that overlaps the gap between the pixels in the first image. For example, a first pixel (a first dashed-line grid at the upper left corner) in the second image shown by the dashed-line box in FIG. 12 overlaps 1/2 of a gap between the first pixel and the second pixel in the first image shown by the solid-line box, so that the first pixel (the first dashed-line grid at the upper left corner) in the second image shown by the dashed-line box in FIG. 12 is the third pixel. In this embodiment, the grayscale value of the third part that is in the gap between the pixels in the first image and that overlaps the third pixel is updated to the average value of the grayscale value of the gap and the grayscale value of the third pixel, to eliminate the screen door effect of the image caused by the gaps between the pixels in the first image.

It should be further noted that, in this embodiment, after the electromagnetic vibrator is used to vibrate the display screen according to a vibration direction and a vibration distance shown in FIG. 12, most of the gaps between the pixels in the first image can be covered by the pixels in the second image, thereby eliminating the gaps, and preventing the first image from presenting the screen door effect. It should be further noted that, because of the vibration of the electromagnetic vibrator, the essence of the screen door effect of the image, that is, the gaps between the pixels can be eliminated. However, overall color brightness of the image is reduced, and a reducing ratio is a ratio of an area of the gaps between the pixels to a display area of the pixels. Because the ratio is usually very small, a visual effect is rarely affected. Therefore, the screen door effect can be eliminated through the vibration of the electromagnetic vibrator without changing the resolution of the display screen.

Based on the foregoing optional embodiment of the present disclosure, the edge of the object in the target image obtained after the first update operation shown in the foregoing optional embodiment of the present disclosure and the second update operation shown in the foregoing optional embodiment of the present disclosure are performed on the first image changes from the aliasing shape to the smooth shape, and the target image has no screen door effect. In this way, a display effect of the target image can be greatly improved.

In the technical solution provided in step S208, the target image can be obtained after the superimposition operation is performed on the first image and the second image. The edge of the object in the target image changes from the aliasing shape to the smooth shape, and the gaps between the pixels in the target image are eliminated. That is, the display effect of the processed first image, namely, the target image is greatly improved. After the target image is obtained, in this embodiment of the present disclosure, the target image can be displayed on the display screen of the VR device. In this way, no aliasing and screen door effect are visually caused to a user, without changing the resolution of the display screen, thereby improving visual viewing experience of the user.

It should be noted that, in this embodiment of the present disclosure, the first image and the second image are not actually displayed on the display screen of the VR device, but the target image obtained after processing is directly displayed on the display screen of the VR device. In this way, the display effect of the image viewed by the user through the VR device can be ensured.

It should be noted that, for ease of description, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also understand that the embodiments described in this specification are all exemplary embodiments, and the involved actions and modules are not necessarily mandatory to the present disclosure.

Based on the foregoing descriptions of the embodiments, a person skilled in the art may clearly understand that the method in the foregoing embodiments may be implemented by software in addition to a necessary universal hardware platform or by hardware only. However, the former is a better implementation in most cases. Based on such an understanding, the technical solutions of the present disclosure or the part contributing to the existing technology may be implemented in the form of a software product. The computer software product is stored in a storage medium (for example, a read-only memory (ROM)/random access memory (RAM), a magnetic disk, or an optical disc), and includes several instructions for instructing a terminal device (which may be a mobile phone, a computer, a server, a network device, or the like) to perform the method according to the embodiments of the present disclosure.

According to another aspect of the embodiments of the present disclosure, a VR device is further provided. The VR device in this embodiment may include:

an electromagnetic vibrator and a processor. The electromagnetic vibrator may be disposed at a back surface of a display screen of the VR device, and is configured to control the display screen of the VR device to vibrate to control a first image to be displayed to move by a first distance along a first direction, where an edge of a target object in the first image has an aliasing shape. The processor may be configured to perform step S202 to step S208 shown in the image display method in a VR device in the foregoing embodiment of the present disclosure, which may specifically include: obtaining the first image before the electromagnetic vibrator vibrates; obtaining a second image after the electromagnetic vibrator vibrates, the second image being an image obtained after the first image is moved by the first distance along the first direction; performing a superimposition operation on the first image and the second image to obtain a target image, an edge of the target object in the target image changing from the aliasing shape to a smooth shape; and displaying the target image in the VR device.

It should be noted that, a type or a model of the VR device is not specifically limited in this embodiment of the present disclosure. For example, the VR device may be VR glasses or a head-mounted helmet. The VR device in this embodiment of the present disclosure may further include a lens, mainly used for forming a VR field of view. The VR device may further include a display screen. An electromagnetic vibrator may be disposed at a back surface of the display screen. The electromagnetic vibrator may be configured to control an image to be displayed in the VR device to move by a particular distance in a specific direction. Herein, it should be noted that, the display screen of the VR device in this embodiment of the present disclosure may have relatively low resolution. In this embodiment of the present disclosure, the electromagnetic vibrator may be disposed at the back surface of the display screen to avoid aliasing of an edge of an object in the image that is caused due to the relatively low resolution of the display screen. It should be further noted that, a disposition position of the electromagnetic vibrator at the back surface of the display screen is not specifically limited in this embodiment of the present disclosure. The disposition position of the electromagnetic vibrator may be set according to an actual requirement. It should be further noted that, a type and a model of the electromagnetic vibrator are not specifically limited in this embodiment of the present disclosure. For example, the electromagnetic vibrator may be a micro high-frequency electromagnetic vibrator.

It should be further noted that, the electromagnetic vibrator may drive, through vibration of the electromagnetic vibrator, the display screen to vibrate. It should be noted that, a vibration frequency, a vibration direction, and a vibration distance of the electromagnetic vibrator may be set according to an actual requirement. This is not specifically limited herein. Vibration of the display screen by the electromagnetic vibrator is described in detail below with reference to FIG. 3 to FIG. 6. As shown in FIG. 3, the electromagnetic vibrator is disposed at the back surface of the display screen of the VR device. A front surface of the display screen of the VR device is shown in FIG. 4, and each grid in FIG. 4 indicates one pixel. As shown in FIG. 5, after the electromagnetic vibrator is turned on, high-frequency vibration is generated. An arrow in FIG. 5 indicates a vibration direction of the electromagnetic vibrator viewed from the back surface of the display screen, and indicates vibration towards the lower left corner. The electromagnetic vibrator drives the display screen to vibrate. Comparison of the display screen before and after the vibration is shown in FIG. 6. A solid-line box in FIG. 6 indicates the display screen before the vibration, and a dashed-line box indicates the display screen after the vibration. An arrow in FIG. 6 indicates a vibration direction of the display screen viewed from the front surface of the display screen, and indicates vibration towards the lower right corner. Assuming that a side length of each grid in FIG. 6 indicates one pixel distance, a vibration distance of the display screen in FIG. 6 is $$\frac{\sqrt{2}}{2} \times$$

the pixel distance.

The processor in this embodiment of the present disclosure may obtain the first image to be displayed by the VR device. The first image may be an image to be displayed by the VR device. Due to the relatively low resolution of the display screen of the VR device, the edge of the target object in the first image displayed on the display screen of the VR device has the aliasing shape. Herein, it should be noted that, the target object is not specifically limited in this embodiment of the present disclosure. For example, as shown in FIG. 7 and FIG. 8, the target object in the display screen in FIG. 7 is a straight line, and FIG. 8 shows the first image. The straight line on the display screen has an aliasing shape, as shown by a grid with a cross in the figure.

The electromagnetic vibrator may vibrate the display screen to move, by the first distance along the first direction, the first image to be displayed on the display screen. The first direction may be a direction in which the electromagnetic vibrator drives the display screen to vibrate, and the first distance may be the vibration distance of the display screen.

To eliminate aliasing of the edge of the target object in the first image, and make imaging of the target object clearer, in this embodiment of the present disclosure, preferably, the electromagnetic vibrator controls the first image to move by the first distance along the first direction. An angle between the first direction and a horizontal direction is 45 degrees. Specifically, an angle between the first direction and one side of a grid is 45 degrees. Each pixel in the first image is indicated by one grid. For example, the first direction may be the lower right corner, the lower left corner, the upper right corner, or the upper left corner. As shown in FIG. 9, a solid-line box indicates the display screen before the vibration, and a dashed-line box indicates the display screen after the vibration. It can be learned from FIG. 9 that the first direction is the lower right corner. Preferably, the first distance may be calculated according to the following formula:

$$L = \frac{\sqrt{2}}{2} \times m,$$

where L is the first distance, and m is the pixel distance in the first image. As shown in FIG. 9, a length of one side of a grid in FIG. 9 indicates a pixel distance. It can be learned from FIG. 9 that the first distance is $$\frac{\sqrt{2}}{2}$$

times the pixel distance.

It should be noted that, in this embodiment of the present disclosure, the electromagnetic vibrator is used to control the first image to move by $$\frac{\sqrt{2}}{2}$$

times the pixel distance along the direction that has an angle of 45 degrees from the horizontal direction, so that a pixel in the display screen after the vibration can cover a pixel in the display screen before the vibration, to eliminate aliasing of the edge of the target object in the first image by performing a corresponding processing operation on the images before and after the vibration, thereby improving the image display effect of the display screen of the VR device.

After the electromagnetic vibrator vibrates, the display screen vibrates under the action of the electromagnetic vibrator, so that the first image is moved by the first distance along the first direction, to obtain the second image. The processor may obtain the second image. As shown in FIG. 9 and FIG. 10, in FIG. 9, relative positions of the display screen before and after the vibration are compared to indicate a movement direction and a movement distance of the first image. As shown in FIG. 9, the first image is moved along a direction of the lower right corner, and after the electromagnetic vibrator vibrates, the second image is obtained. In FIG. 9, the solid-line box indicates the first image, and the dashed-line box indicates the second image. It should be noted that, after the electromagnetic vibrator drives the display screen to vibrate, to avoid impact of the vibration on a viewport and an orientation of a rendering scene of the VR device, the orientation and a position of the rendering scene need to be changed. For example, when the display screen vibrates to the lower right corner, the viewport is adjusted to the upper left, and the movement distance is the same as a vibration distance. In this way, a position of a rendering object remains unchanged. After the electromagnetic vibrator vibrates and the rendering viewport is changed, a display effect of the straight line in FIG. 7 on the display screen is shown in FIG. 10, and refer to a grid with a cross in FIG. 10.

After obtaining the first image and the second image, the processor may perform the superimposition operation on the first image and the second image. After the superimposition operation is performed, the target image can be obtained, and the edge of the target object in the target image changing from the aliasing shape to the smooth shape. Herein, it should be noted that, the superimposition operation performed on the first image and the second image is to update a grayscale value of each pixel in the first image, instead of simply superimposing the two images, to make the edge of the target object in the first image change from the aliasing shape to the smooth shape, thereby improving a display effect of the first image.

In an optional embodiment, the performing a superimposition operation on the first image and the second image to obtain a target image may include: performing a first update operation on a grayscale value of a first pixel that is in the first image and that overlaps the second image.

It should be noted that, the first pixel is a pixel in the first image, and the first pixel completely or partially overlaps the second image. For example, as shown in FIG. 9, 1/4 of a first pixel (a first grid at the upper left corner) in the first image overlaps the second image, so that the pixel is the first pixel. For another example, as shown in FIG. 9, all of a first pixel (a second grid at a second row at the upper left corner) in the first image overlaps the second image, so that the pixel is the first pixel.

It should be further noted that, after the first pixel that is in the first image and that overlaps the second image is determined, in this embodiment, the first update operation may be performed on the first pixel. The first update operation may include two parts of operations that are specifically:

a first part of operation: updating a grayscale value of a first part that is in the first pixel and that overlaps a second pixel to an average value of the grayscale value of the first pixel and a grayscale value of the second pixel; and a second part of operation: updating a grayscale value of a second part that is in the first pixel and that does not overlap the second image to a predetermined ratio of the grayscale value of the first pixel.

For the foregoing operation, it should be noted that, the second pixel may be a pixel that is in the second image and that overlaps the first pixel. For example, as shown in FIG. 9, a first pixel (a first grid at the upper left corner) in the second image overlaps the first pixel (the first grid at the upper left corner) in the first image, that is, 1/4 of the first pixel, so that the first pixel in the second image is the second pixel.

It should be further noted that, as shown in FIG. 9, the first pixel in the first image may be divided into two parts, where one part overlaps the second pixel, and the other part does not overlap the second image. In this embodiment, the grayscale value of the first part that is in the first pixel and that overlaps the second pixel may be updated, to update the grayscale value to the average value of the grayscale value of the first pixel and the grayscale value of the second pixel; and the grayscale value of the second part that is in the first pixel and that does not overlap the second image may be updated, to update the grayscale value to the predetermined ratio of the grayscale value of the first pixel. The predetermined ratio in this embodiment is preferably 1/2. After the foregoing update operations are performed on the first image and the second image, the target image can be obtained. The target image may be an image obtained after the grayscale value of the pixel in the first image is updated. For example, in the target image shown in FIG. 11, a part with a vertical line is the second part that is in the first pixel and that does not overlap the second image, and the grayscale value of the second part is 1/2 of a grayscale value of a corresponding pixel part in the first image, and may be obtained with reference to a grayscale value of a pixel in the images shown in FIG. 8 and FIG. 10; and a part with a cross is the first part that is in the first pixel and that overlaps the second pixel, and the grayscale value of the first part is the average value of the grayscale value of the first pixel and the grayscale value of the second pixel, and may be obtained with reference to a grayscale value of a pixel in the images shown in FIG. 8 and FIG. 10.

In this embodiment, the first update operation is performed on the first pixel that is in the first image and overlaps the second image, so that the edge of the target object in the target image obtained after at least the first update operation is performed on the first image changes from the aliasing shape to the smooth shape, thereby eliminating aliasing of the edge of the object in the image in the VR device, and improving the image display effect of the VR device.

Considering that an image is caused to present a screen door effect due to the relatively low resolution of the display screen of the VR device, that is, there are gaps between pixels in the image, and a distance between the gaps is less than the pixel distance. For example, in an image shown by a solid-line box in FIG. 12, a bold side between small grids indicates a gap between pixels. To eliminate the gap between the pixels in the image, to prevent the screen door effect of the image from affecting an image display effect, in this embodiment of the present disclosure, the electromagnetic vibrator may be further used to vibrate the display screen to eliminate the screen door effect in the image. For details, refer to the following optional embodiment:

In another optional embodiment, gaps whose distance therebetween is a second distance exist between pixels in the first image to be displayed by the VR device. Herein, it should be noted that, the second distance is less than the pixel distance. To eliminate a screen door effect of the first image caused by the gaps, after the first image and the second image are obtained, the performing, by the processor, a superimposition operation on the first image and the second image to obtain a target image may further include: performing a second update operation on grayscale values of the gaps between the pixels in the first image.

It should be noted that, as shown in FIG. 12, the image shown by the solid-line box indicates the first image, and an image shown by a dashed-line box indicates the second image. It can be learned from FIG. 12 that, the gaps between the pixels in the first image may be divided into two parts, where one part overlaps a pixel in the second image, and the other part does not overlap a pixel in the second image.

In this embodiment, the second update operation may be performed on the grayscale values of the gaps between the pixels in the first image, to eliminate the screen door effect caused by the gaps between the pixels in the first image. Specifically, in this embodiment, a grayscale value of a third part that is in the gap between the pixels in the first image and that overlaps a third pixel may be updated to an average value of the grayscale value of the gap and a grayscale value of the third pixel. Herein, it should be noted that, the third pixel may be a pixel that is in the second image and that overlaps the gap between the pixels in the first image. For example, a first pixel (a first dashed-line grid at the upper left corner) in the second image shown by the dashed-line box in FIG. 12 overlaps 1/2 of a gap between the first pixel and the second pixel in the first image shown by the solid-line box, so that the first pixel (the first dashed-line grid at the upper left corner) in the second image shown by the dashed-line box in FIG. 12 is the third pixel. In this embodiment, the grayscale value of the third part that is in the gap between the pixels in the first image and that overlaps the third pixel is updated to the average value of the grayscale value of the gap and the grayscale value of the third pixel, to eliminate the screen door effect of the image caused by the gaps between the pixels in the first image.

It should be further noted that, in this embodiment, after the electromagnetic vibrator is used to vibrate the display screen according to a vibration direction and a vibration distance shown in FIG. 12, most of the gaps between the pixels in the first image can be covered by the pixels in the second image, thereby eliminating the gaps, and preventing the first image from presenting the screen door effect. It should be further noted that, because of the vibration of the electromagnetic vibrator, the essence of the screen door effect of the image, that is, the gaps between the pixels can be eliminated. However, overall color brightness of the image is reduced, and a reducing ratio is a ratio of an area of the gaps between the pixels to a display area of the pixels. Because the ratio is usually very small, a visual effect is rarely affected. Therefore, the screen door effect can be eliminated through the vibration of the electromagnetic vibrator without changing the resolution of the display screen.

Based on the foregoing optional embodiment of the present disclosure, the edge of the object in the target image obtained after the first update operation shown in the foregoing optional embodiment of the present disclosure and the second update operation shown in the foregoing optional embodiment of the present disclosure are performed on the first image changes from the aliasing shape to the smooth shape, and the target image has no screen door effect. In this way, a display effect of the target image can be greatly improved.

The target image can be obtained after the processor performs the superimposition operation on the first image and the second image. The edge of the object in the target image changes from the aliasing shape to the smooth shape, and the gaps between the pixels in the target image are eliminated. That is, the display effect of the processed first image, namely, the target image is greatly improved. After the target image is obtained, the target image can be displayed on the display screen of the VR device. In this way, no aliasing and screen door effect are visually caused to a user, without changing the resolution of the display screen, thereby improving visual viewing experience of the user.

It should be noted that, in this embodiment of the present disclosure, the first image and the second image are not actually displayed on the display screen of the VR device, but the target image obtained after processing is directly displayed on the display screen of the VR device. In this way, the display effect of the image viewed by the user through the VR device can be ensured.

In this embodiment of the present disclosure, an electromagnetic vibrator is disposed in the VR device, the electromagnetic vibrator can cause a first image to be displayed by the VR device to move by a first distance along a first direction, where an edge of a target object in the first image has an aliasing shape; after the electromagnetic vibrator vibrates, the first image is moved by the first distance along the first direction, to obtain a second image; and the processor performs a superimposition operation on the second image and the first image, to obtain a target image and display the target image in the VR device, where an edge of the target object in the target image changes from the aliasing shape to a smooth shape, to eliminate aliasing of the edge of the target object in the first image, thereby resolving a technical problem in a related technology that an edge of an object in an image has an aliasing shape due to relatively low resolution of a display screen of VR glasses, and improving an image display effect of the VR device.

Figure 13:
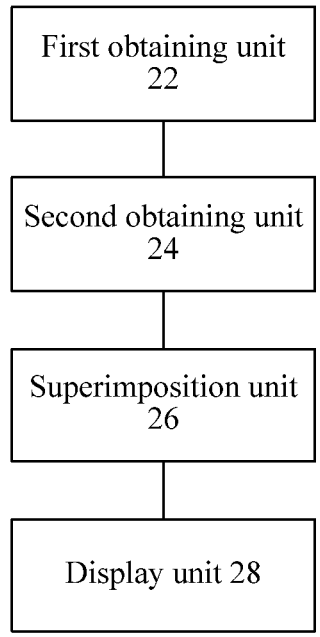
FIG. 13 is a schematic diagram of an optional image display apparatus in a VR device according to an embodiment of the present disclosure.

According to still another aspect of the embodiments of the present disclosure, an image display apparatus in a VR device that is configured to implement the foregoing image display method in a VR device is provided. FIG. 13 is a schematic diagram of an optional image display apparatus in a VR device according to an embodiment of the present disclosure. As shown in FIG. 13, the apparatus may include:

a first obtaining unit 22, configured to obtain a first image to be displayed by the VR device, an edge of a target object in the first image having an aliasing shape, the VR device being provided with an electromagnetic vibrator, and the electromagnetic vibrator being configured to control the first image to move by a first distance along a first direction; a second obtaining unit 24, configured to obtain a second image after the electromagnetic vibrator vibrates, the second image being an image obtained after the first image is moved by the first distance along the first direction; a superimposition unit 26, configured to perform a superimposition operation on the first image and the second image to obtain a target image, an edge of the target object in the target image changing from the aliasing shape to a smooth shape; and a display unit 28, configured to display the target image in the VR device.

It should be noted that, the first obtaining unit 22 in this embodiment may be configured to perform step S202 in the embodiments of this application; the second obtaining unit 24 in this embodiment may be configured to perform step S204 in the embodiments of this application; the superimposition unit 26 in this embodiment may be configured to perform step S206 in the embodiments of this application; and the display unit 28 in this embodiment may be configured to perform step S208 in the embodiments of this application.

Herein, it should be noted that, examples and application scenarios implemented by the foregoing modules and corresponding steps are the same but are not limited to the content disclosed in the foregoing embodiments. It should be noted that, the foregoing modules may be run in the hardware environment shown in FIG. 1 as a part of the apparatus, and may be implemented through software, or may be implemented through hardware.

Figure 14:
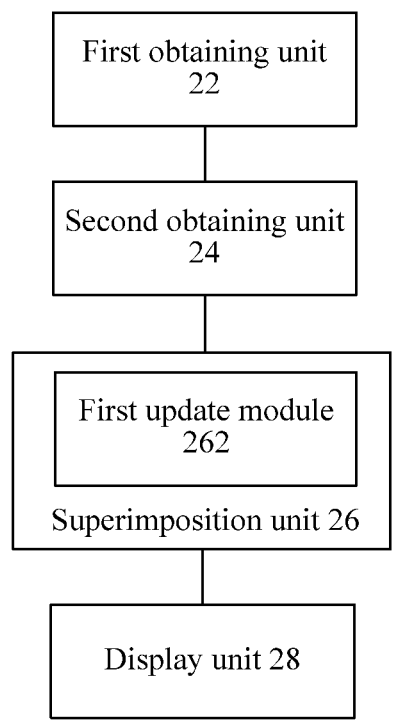
FIG. 14 is a schematic diagram of another optional image display apparatus in a VR device according to an embodiment of the present disclosure.

In an optional embodiment, as shown in FIG. 14, the superimposition unit 26 may include: a first update module 262, configured to perform a first update operation on a grayscale value of a first pixel that is in the first image and that overlaps the second image, where the first update operation is used to instruct to update a grayscale value of a first part that is in the first pixel and that overlaps a second pixel to an average value of the grayscale value of the first pixel and a grayscale value of the second pixel, and update a grayscale value of a second part that is in the first pixel and that does not overlap the second image to a predetermined ratio of the grayscale value of the first pixel, and the second pixel is a pixel that is in the second image and that overlaps the first pixel, where at least the first update operation is performed on the first image to obtain the target image.

Optionally, the predetermined ratio includes 1/2.

Figure 15:
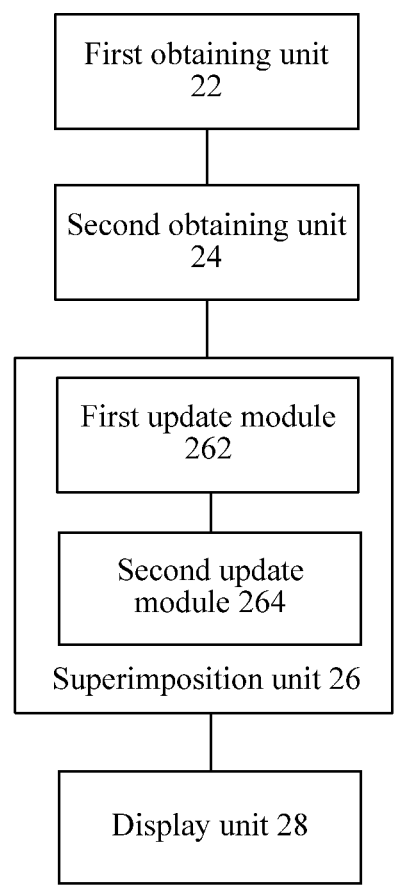
FIG. 15 is a schematic diagram of still another optional image display apparatus in a VR device according to an embodiment of the present disclosure.

In an optional embodiment, gaps whose distance therebetween is a second distance may exist between pixels in the first image, and as shown in FIG. 15, the superimposition unit 26 may further include: a second update module 264, configured to perform a second update operation on grayscale values of the gaps between the pixels in the first image, where the second update operation is used to instruct to update a grayscale value of a third part that is in the gap and that overlaps a third pixel to an average value of the grayscale value of the gap and a grayscale value of the third pixel, and the third pixel is a pixel that is in the second image and that overlaps the gap, where the first update operation and the second update operation are performed on the first image to obtain the target image.

In an optional embodiment, the first distance may be calculated according to the following formula:

$$L = \frac{\sqrt{2}}{2} \times m,$$

where L is the first distance, and m is a pixel distance in the first image.

In an optional embodiment, an angle between the first direction and one side of a grid may be 45 degrees, and each pixel in the first image may be indicated by one grid.

Herein, it should be noted that, examples and application scenarios implemented by the foregoing modules and corresponding steps are the same but are not limited to the content disclosed in the foregoing embodiments. It should be noted that, the foregoing modules may be run in the hardware environment shown in FIG. 1 as a part of the apparatus, and may be implemented through software, or may be implemented through hardware.

Based on the foregoing modules, aliasing of the edge of the target object in the first image is eliminated, thereby resolving a technical problem in a related technology that an edge of an object in an image has an aliasing shape due to relatively low resolution of a display screen of VR glasses, and improving an image display effect of the VR device.

According to still another aspect of the embodiments of the present disclosure, an electronic apparatus configure to implement the foregoing image display method in a VR device is further provided.

Figure 16:
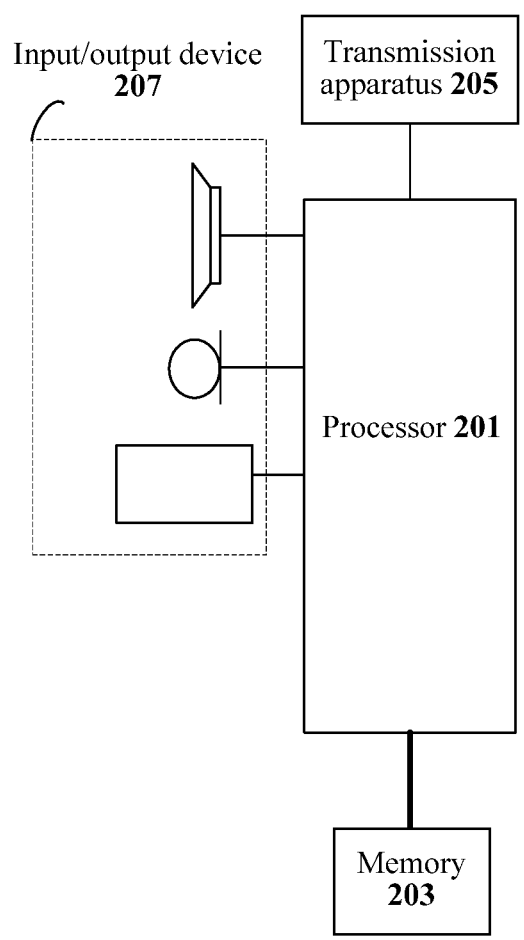
FIG. 16 is a structural block diagram of an electronic apparatus according to an embodiment of the present disclosure.

FIG. 16 is a structural block diagram of an electronic apparatus according to an embodiment of the present disclosure. As shown in FIG. 16, the terminal may include: one or more (only one is shown) processor 201, and a memory 203. The memory 203 may store a computer program, and the processor 201 may be configured to run the computer program to perform the image display method in a VR device in the embodiments of the present disclosure.

The memory 203 may be configured to store the computer program and a module, for example, a program instruction/module corresponding to the image display method and apparatus in a VR device in the embodiments of the present disclosure. The processor 201 is configured to run a software program and a module that are stored in the memory 203, to execute various functional applications and perform data processing, that is, implement the foregoing image display method in a VR device. The memory 203 may include a high-speed random memory, and may also include a non-volatile memory such as one or more magnetic storage apparatuses, a flash memory, or another non-volatile solid-state memory. In some embodiments, the memory 203 may further include memories remotely disposed relative to the processor 201, and these remote memories may be connected to the terminal through a network. Examples of the network include, but are not limited to, the Internet, an intranet, a local area network, a mobile communications network, and a combination thereof.

Optionally, as shown in FIG. 16, the electronic apparatus may further include a transmission apparatus 205 and an input/output device 207. The foregoing transmission apparatus 205 is configured to receive or send data through a network. Specific examples of the foregoing network may include a wired network and a wireless network. In an embodiment, the transmission apparatus 205 includes a network interface controller (NIC) that may be connected to another network device and a router by using a network cable, thereby communicating with the Internet or a local area network. In an embodiment, the transmission apparatus 205 is a radio frequency (RF) module that is configured to communicate with the Internet in a wireless manner.

Specifically, the memory 203 is configured to store the computer program.

The processor 201 may be configured to run the computer program stored in the memory 203, to perform the following steps: obtaining a first image to be displayed by the VR device, an edge of a target object in the first image having an aliasing shape, the VR device being provided with an electromagnetic vibrator, and the electromagnetic vibrator being configured to control the first image to move by a first distance along a first direction; obtaining a second image after the electromagnetic vibrator vibrates, the second image being an image obtained after the first image is moved by the first distance along the first direction; performing a superimposition operation on the first image and the second image to obtain a target image, an edge of the target object in the target image changing from the aliasing shape to a smooth shape; and displaying the target image in the VR device.

The processor 201 is further configured to perform the following step: performing a first update operation on a grayscale value of a first pixel that is in the first image and that overlaps the second image, where the first update operation is used to instruct to update a grayscale value of a first part that is in the first pixel and that overlaps a second pixel to an average value of the grayscale value of the first pixel and a grayscale value of the second pixel, and update a grayscale value of a second part that is in the first pixel and that does not overlap the second image to a predetermined ratio of the grayscale value of the first pixel, and the second pixel is a pixel that is in the second image and that overlaps the first pixel, where at least the first update operation is performed on the first image to obtain the target image.

The processor 201 is further configured to perform the following step: performing a second update operation on grayscale values of the gaps between the pixels in the first image, where the second update operation is used to instruct to update a grayscale value of a third part that is in the gap and that overlaps a third pixel to an average value of the grayscale value of the gap and a grayscale value of the third pixel, and the third pixel is a pixel that is in the second image and that overlaps the gap, where the first update operation and the second update operation are performed on the first image to obtain the target image, where gaps whose distance therebetween is a second distance exist between pixels in the first image.

According to this embodiment of the present disclosure, an image display solution in a VR device is provided. An electromagnetic vibrator is disposed in the VR device, the electromagnetic vibrator can cause a first image to be displayed by the VR device to move by a first distance along a first direction, where an edge of a target object in the first image has an aliasing shape; after the electromagnetic vibrator vibrates, the first image is moved by the first distance along the first direction, to obtain a second image; and then a superimposition operation is performed on the second image and the first image, to obtain a target image and display the target image in the VR device, where an edge of the target object in the target image changes from the aliasing shape to a smooth shape, to eliminate aliasing of the edge of the target object in the first image, thereby resolving a technical problem in a related technology that an edge of an object in an image has an aliasing shape due to relatively low resolution of a display screen of VR glasses, and improving an image display effect of the VR device.

Optionally, refer to the examples described in the foregoing embodiments for specific examples in this embodiment. Details are not described in this embodiment.

A person of ordinary skill in the art may understand that, the structure shown in FIG. 16 is only an example. The terminal may be a terminal device such as a smartphone (for example, an Android mobile phone or an iOS mobile phone), a tablet computer, a palmtop computer, an MID, or a PAD. FIG. 16 does not limit the structure of the foregoing electronic apparatus. For example, the electronic apparatus may further include more or fewer components (such as a network interface and a display apparatus) than those shown in FIG. 16, or have a configuration different from that shown in FIG. 16.

A person of ordinary skill in the art may understand that all or some of the steps of the methods of the foregoing embodiments may be implemented by a program instructing relevant hardware of the terminal device. The program may be stored in a computer-readable storage medium. The storage medium may be a flash disk, a ROM, a RAM, a magnetic disk, or an optical disc.

According to still another aspect of the embodiments of the present disclosure, a storage medium is further provided. Optionally, in this embodiment, the storage medium stores a computer program, and the computer program is configured to perform the image display method in a VR device when being run.

Optionally, in this embodiment, the storage medium may be located in at least one of a plurality of network devices in the network shown in the foregoing embodiments.

Optionally, in this embodiment, the storage medium is configured to store program code for performing the following steps:

S1: Obtain a first image to be displayed by the VR device, an edge of a target object in the first image having an aliasing shape, the VR device being provided with an electromagnetic vibrator, and the electromagnetic vibrator being configured to control the first image to move by a first distance along a first direction;

S2: Obtain a second image after the electromagnetic vibrator vibrates, the second image being an image obtained after the first image is moved by the first distance along the first direction;

S3: Perform a superimposition operation on the first image and the second image to obtain a target image, an edge of the target object in the target image changing from the aliasing shape to a smooth shape; and S4: Display the target image in the VR device.

Optionally, the storage medium is further configured to store program code for performing the following step: performing a first update operation on a grayscale value of a first pixel that is in the first image and that overlaps the second image, where the first update operation is used to instruct to update a grayscale value of a first part that is in the first pixel and that overlaps a second pixel to an average value of the grayscale value of the first pixel and a grayscale value of the second pixel, and update a grayscale value of a second part that is in the first pixel and that does not overlap the second image to a predetermined ratio of the grayscale value of the first pixel, and the second pixel is a pixel that is in the second image and that overlaps the first pixel, where at least the first update operation is performed on the first image to obtain the target image.

Optionally, the storage medium is further configured to store program code for performing the following step:

performing a second update operation on grayscale values of the gaps between the pixels in the first image, where the second update operation is used to instruct to update a grayscale value of a third part that is in the gap and that overlaps a third pixel to an average value of the grayscale value of the gap and a grayscale value of the third pixel, and the third pixel is a pixel that is in the second image and that overlaps the gap, where the first update operation and the second update operation are performed on the first image to obtain the target image, and gaps whose distance therebetween is a second distance exist between pixels in the first image.

Optionally, refer to the examples described in the foregoing embodiments for specific examples in this embodiment. Details are not described in this embodiment.

Optionally, in this embodiment, the storage medium may include, but is not limited to: any medium that can store program code, such as a USB flash drive, a read only memory (ROM), a random access memory (RAM), a removable hard disk, a magnetic disk, or an optical disc.

The sequence numbers of the foregoing embodiments of the present disclosure are merely for description purpose but do not indicate the preference of the embodiments.

If the integrated units in the foregoing embodiments are implemented in a form of software functional units and are sold or used as an independent product, the units may be stored in a computer-readable storage medium. Based on such an understanding, the technical solutions of the present disclosure essentially, or the part contributing to the existing technology, or all or some of the technical solutions may be represented in a form of a software product. The computer software product is stored in a storage medium and includes several instructions for instructing one or more computer devices (which may be a PC, a server, a network device, or the like) to perform all or some of the steps of the methods in the embodiments of the present disclosure.

In the foregoing embodiments of the present disclosure, the descriptions of the embodiments have respective focuses. For a part not described in detail in an embodiment, refer to a related description of another embodiment.

In the several embodiments provided in this application, it should be understood that the disclosed client may be implemented in other manners. The described apparatus embodiments are merely exemplary. For example, division of the units is merely division of logic functions, and there may be another division manner during actual implementation. For example, a plurality of units or components may be combined or may be integrated into another system, or some features may be omitted or not be executed. In addition, the displayed or discussed mutual coupling, or direct coupling, or communication connections may be implemented through some interfaces. Indirect coupling or communication connections between the units or modules may be implemented in electronic or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated units may be implemented in a form of hardware or may be implemented in a form of a software functional unit.

It should be noted that the above descriptions are merely preferred embodiments of the present disclosure, and a person of ordinary skill in the art may make various improvements and refinements without departing from the spirit of the present disclosure. All such modifications and refinements should also be considered as falling within the protection scope of the present disclosure.

What is claimed is:

1. An image display method performed at a virtual reality (VR) device having one or more processors and memory storing a plurality of programs to be executed by the one or more processors, comprising:
   obtaining a first image to be displayed by the VR device, an edge of a target object in the first image having an aliasing shape, the VR device being provided with an electromagnetic vibrator, and the electromagnetic vibrator being configured to control the first image to move by a first distance along a first direction;
   obtaining a second image after the electromagnetic vibrator vibrates, the second image being an image obtained after the first image is moved by the first distance along the first direction;
   performing a superimposition operation on the first image and the second image to obtain a target image, an edge of the target object in the target image changing from the aliasing shape to a smooth shape; and
   displaying the target image in the VR device.

2. The method according to claim 1, wherein the performing a superimposition operation on the first image and the second image to obtain a target image comprises:
   performing a first update operation on a grayscale value of a first pixel that is in the first image and that overlaps the second image, wherein the first update operation is used to instruct to update a grayscale value of a first part that is in the first pixel and that overlaps a second pixel to an average value of the grayscale value of the first pixel and a grayscale value of the second pixel, and update a grayscale value of a second part that is in the first pixel and that does not overlap the second image to a predetermined ratio of the grayscale value of the first pixel, and the second pixel is a pixel that is in the second image and that overlaps the first pixel, wherein
   at least the first update operation is performed on the first image to obtain the target image.

3. The method according to claim 2, wherein the predetermined ratio comprises 1/2.

4. The method according to claim 2, wherein gaps whose distance therebetween is a second distance exist between pixels in the first image, and the performing a superimposition operation on the first image and the second image to obtain a target image further comprises:
   performing a second update operation on grayscale values of the gaps between the pixels in the first image, wherein the second update operation is used to instruct to update a grayscale value of a third part that is in the gap and that overlaps a third pixel to an average value of the grayscale value of the gap and a grayscale value of the third pixel, and the third pixel is a pixel that is in the second image and that overlaps the gap, wherein the first update operation and the second update operation are performed on the first image to obtain the target image.

5. The method according to claim 1, wherein the first distance is calculated according to the following formula:

$$L = \frac{\sqrt{2}}{2} \times m$$

wherein L is the first distance, and m is a pixel distance in the first image.

6. The method according to claim 1, wherein an angle between the first direction and one side of a grid is 45 degrees, and each pixel in the first image is indicated by one grid.

7. An image display apparatus in a virtual reality (VR) device, comprising:
a first obtaining unit, configured to obtain a first image to be displayed by the VR device, an edge of a target object in the first image having an aliasing shape, the VR device being provided with an electromagnetic vibrator, and the electromagnetic vibrator being configured to control the first image to move by a first distance along a first direction;
a second obtaining unit, configured to obtain a second image after the electromagnetic vibrator vibrates, the second image being an image obtained after the first image is moved by the first distance along the first direction;
a superimposition unit, configured to perform a superimposition operation on the first image and the second image to obtain a target image, an edge of the target object in the target image changing from the aliasing shape to a smooth shape; and
a display unit, configured to display the target image in the VR device.

8. The apparatus according to claim 7, wherein the superimposition unit comprises:
a first update module, configured to perform a first update operation on a grayscale value of a first pixel that is in the first image and that overlaps the second image, wherein the first update operation is used to instruct to update a grayscale value of a first part that is in the first pixel and that overlaps a second pixel to an average value of the grayscale value of the first pixel and a grayscale value of the second pixel, and update a grayscale value of a second part that is in the first pixel and that does not overlap the second image to a predetermined ratio of the grayscale value of the first pixel, and the second pixel is a pixel that is in the second image and that overlaps the first pixel, wherein
at least the first update operation is performed on the first image to obtain the target image.

9. The apparatus according to claim 8, wherein the predetermined ratio comprises 1/2.

10. The apparatus according to claim 8, wherein gaps whose distance therebetween is a second distance exist between pixels in the first image, and the superimposition unit further comprises:
a second update module, configured to perform a second update operation on grayscale values of the gaps between the pixels in the first image, wherein the second update operation is used to instruct to update a grayscale value of a third part that is in the gap and that overlaps a third pixel to an average value of the grayscale value of the gap and a grayscale value of the third pixel, and the third pixel is a pixel that is in the second image and that overlaps the gap, wherein
the first update operation and the second update operation are performed on the first image to obtain the target image.

11. The apparatus according to claim 7, wherein the first distance is calculated according to the following formula:

$$L = \frac{\sqrt{2}}{2} \times m$$

wherein L is the first distance, and m is a pixel distance in the first image.

12. The apparatus according to claim 7, wherein an angle between the first direction and one side of a grid is 45 degrees, and each pixel in the first image is indicated by one grid.

13. A virtual reality (VR) device, comprising:
an electromagnetic vibrator, disposed in the VR device, and configured to control a first image to be displayed by the VR device to move by a first distance along a first direction, an edge of a target object in the first image having an aliasing shape; and
a processor, configured to: obtain the first image before the electromagnetic vibrator vibrates; obtain a second image after the electromagnetic vibrator vibrates, the second image being an image obtained after the first image is moved by the first distance along the first direction; perform a superimposition operation on the first image and the second image to obtain a target image, an edge of the target object in the target image changing from the aliasing shape to a smooth shape; and display the target image in the VR device.

14. The VR device according to claim 13, wherein the performing a superimposition operation on the first image and the second image to obtain a target image comprises:
performing a first update operation on a grayscale value of a first pixel that is in the first image and that overlaps the second image, wherein the first update operation is used to instruct to update a grayscale value of a first part that is in the first pixel and that overlaps a second pixel to an average value of the grayscale value of the first pixel and a grayscale value of the second pixel, and update a grayscale value of a second part that is in the first pixel and that does not overlap the second image to a predetermined ratio of the grayscale value of the first pixel, and the second pixel is a pixel that is in the second image and that overlaps the first pixel, wherein
at least the first update operation is performed on the first image to obtain the target image.

15. The VR device according to claim 14, wherein the predetermined ratio comprises 1/2.

16. The VR device according to claim 14, wherein gaps whose distance therebetween is a second distance exist between pixels in the first image, and the performing a superimposition operation on the first image and the second image to obtain a target image further comprises:
performing a second update operation on grayscale values of the gaps between the pixels in the first image, wherein the second update operation is used to instruct to update a grayscale value of a third part that is in the gap and that overlaps a third pixel to an average value of the grayscale value of the gap and a grayscale value of the third pixel, and the third pixel is a pixel that is in the second image and that overlaps the gap, wherein
the first update operation and the second update operation are performed on the first image to obtain the target image.

17. The VR device according to claim 13, wherein the first distance is calculated according to the following formula:

$$L = \frac{\sqrt{2}}{2} \times m$$

wherein L is the first distance, and m is a pixel distance in the first image.

18. The VR device according to claim 13, wherein an angle between the first direction and one side of a grid is 45 degrees, and each pixel in the first image is indicated by one grid.

* * * * *